C. P. COOPER.
Egg-Holder.

No. 219,915.　　　　　Patented Sept. 23, 1879.

*Fig 2.*　　　*Fig 3.*

Witnesses:　　　　　　　　　Inventor:
　　　　　　　　　　　　　　Charles P. Cooper
　　　　　　　　　　　　　by his Attorneys

UNITED STATES PATENT OFFICE.

CHARLES P. COOPER, OF NEW YORK, N. Y.

IMPROVEMENT IN EGG-HOLDERS.

Specification forming part of Letters Patent No. 219,915, dated September 23, 1879; application filed July 19, 1879.

*To all whom it may concern:*

Be it known that I, CHARLES P. COOPER, of the city of New York, in the county and State of New York, have invented a new and Improved Egg-Holder, of which the following is a specification.

My invention consists in an egg-holder which may be used at table for holding an egg during the operation of cutting it, and which is composed of two separate and unconnected parts adapted to receive an ordinary table-knife between them, provided with ellipsoidal cavities, and so shaped externally that they may be laid upon the side, and will then have a stable support, so that the knife may be forced downward between the parts for dividing the egg without entailing the necessity of holding said parts. The said parts or sections are preferably made to interlock by means of a lug or projection on one entering a recess in the other.

Figure 1:
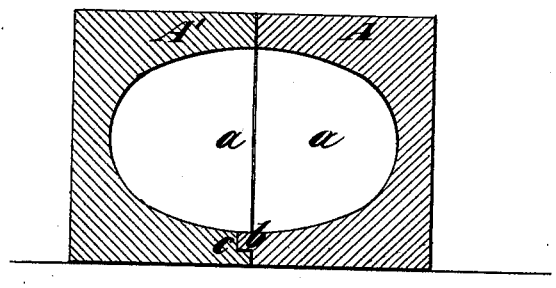
Figure 1:
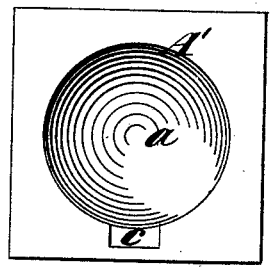
Figure 1:
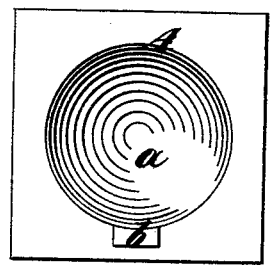

In the accompanying drawings, Figure 1 represents a longitudinal section through a holder embodying my invention, and Figs. 2 and 3 face views of the two parts or sections of which the holder is composed.

Similar letters of reference designate corresponding parts in all the figures.

A A' designate the two parts or sections of which my holder is composed. They are so constructed as to be adapted to receive an ordinary table-knife between them, and may be made of any material which may be readily washed, such as porcelain or metal. Each of said parts is provided with an ellipsoidal cavity, $a$, of such size that when the two parts are placed face to face, as represented in Fig. 1, a receptacle is formed of sufficient size to receive an egg.

Although the two parts A A' are here represented as externally of rectangular shape, they may be modified in form to suit the taste. They are, however, so formed that when an egg is placed between them, and the device is laid upon its side on a table, it will remain in such a position without requiring to be held while a knife is forced downward between the parts or sections for dividing the egg.

For the purpose of preventing them from moving laterally when placed face to face, one of said parts, A, may be furnished with a lug or projection, $b$, adapted to enter a recess, $c$, in the other part, A'.

Although the recess $c$ is here represented as opening into the cavity $a$ on one side, it may be isolated from said cavity and fit the projection on all four sides. It will then prevent any lateral movement of the parts independently of each other.

By my invention I provide a simple and convenient device for holding an egg, which prevents the burning or soiling of the fingers, and which is of such external shape that when laid upon the table it will remain on its side when so placed without the necessity of holding it while a knife is forced downward between the parts or sections for dividing the egg.

What I claim as my invention, and desire to secure by Letters Patent, is—

1. An egg-holder composed of two separate and unconnected parts or sections, adapted to receive an ordinary table-knife between them, provided with ellipsoidal cavities, and so shaped externally that they may be laid upon the side, and will then have a stable support, so that the knife may be forced downward between the parts for dividing the egg without entailing the necessity for holding said parts, substantially as specified.

2. An egg-holder composed of two separable and unconnected parts or sections, adapted to receive an ordinary table-knife between them, provided with ellipsoidal cavities, and one of which parts is provided with a lug or projection adapted to enter a recess in the other part, the parts being so shaped externally that they may be laid upon the side, and will then have a stable support, so that the knife may be forced downward between the parts for dividing the egg without entailing the necessity for holding said parts, substantially as specified.

CHARLES P. COOPER.

Witnesses:
FREDK. HAYNES,
THOMAS E. BIRCH.